(12) United States Patent
Aksit et al.

(10) Patent No.: US 6,609,886 B2
(45) Date of Patent: Aug. 26, 2003

(54) COMPOSITE TUBULAR WOVEN SEAL FOR GAS TURBINE NOZZLE AND SHROUD INTERFACE

(75) Inventors: Mahmut Faruk Aksit, Istanbul (TR); Ahmad Safi, Troy, NY (US); Abdul-Azeez Mohammed-Fakir, Schenectady, NY (US); Srikanth Vedantam, Niskayuna, NY (US); Ning Fang, West Chester, OH (US); Gayle Hobbs Goetze, Greenville, SC (US); Brian Peter Arness, Simpsonville, SC (US); John Ellington Greene, Simpsonville, SC (US); Wei-Ming Chi, Fremont, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/029,216

(22) Filed: Dec. 28, 2001

(65) Prior Publication Data

US 2003/0123978 A1 Jul. 3, 2003

(51) Int. Cl.[7] .................................................. F01D 9/02
(52) U.S. Cl. .................. 415/191; 415/209.2; 415/209.3
(58) Field of Search ................................. 415/191, 192, 415/209.2, 209.3, 231; 277/650, 654, 651

(56) References Cited

U.S. PATENT DOCUMENTS

| 4,384,822 A | * | 5/1983 | Schweikl et al. ............ 415/137 |
| 5,301,595 A | * | 4/1994 | Kessie ............................... 87/6 |
| 5,657,998 A | * | 8/1997 | Dinc et al. .................. 277/653 |
| 6,039,325 A | * | 3/2000 | Steinetz et al. ............. 277/633 |

* cited by examiner

Primary Examiner—Ninh H. Nguyen
(74) Attorney, Agent, or Firm—Nixon & Vanderhye

(57) ABSTRACT

A compliant woven tubular seal is provided in an arcuate cavity opening through an axial face of a plurality of shroud segments in opposition to a nozzle retaining ring. The annular composite tubular woven compliant seal includes a stainless steel inner metal core surrounded by an annular layer of silica fiber. Surrounding the silica fiber is a metal foil which prevents flow past the supplemental seal. An outer wear-resistant braiding serves as a protective covering and wear surface.

13 Claims, 3 Drawing Sheets

6,609,886 B2

COMPOSITE TUBULAR WOVEN SEAL FOR GAS TURBINE NOZZLE AND SHROUD INTERFACE

BACKGROUND OF THE INVENTION

The present invention relates to seals in a gas turbine and particularly to a compliant seal for application at the gas turbine nozzle and shroud interface.

In a gas turbine, hot gases of combustion flow from combustors through first-stage nozzles and buckets and through the nozzles and buckets of follow-on turbine stages. The first-stage nozzles typically include an annular array or assemblage of cast nozzle segments each containing one or more nozzle stator vanes per segment. Each first-stage nozzle segment also includes inner and outer band portions spaced radially from one another. Upon assembly of the nozzle segments, the stator vanes are circumferentially spaced from one another to form an annular array thereof between annular inner and outer bands. A nozzle retaining ring coupled to the outer band of the first-stage nozzles supports the first-stage nozzles in the gas flow path of the turbine. An annular nozzle support ring, preferably split at a horizontal midline, is engaged by the inner band and supports the first-stage nozzles against axial movement.

Each stage of the turbine also includes a plurality of shroud segments arranged in an annular array thereof defining an annular inner surface forming part of the hot gas path. The shroud inner surface is spaced from the tips of the buckets of the turbine rotor. It will be appreciated that the nozzles in conjunction with the shrouds and buckets form a turbine stage.

Warpage during operation and during repair of the nozzle and the shrouds may leave a gap between those turbine components. As a consequence, hot gases flowing through the hot gas path may leak or dissipate through the gap. As a result, the efficiency of the turbine is reduced. In efforts to seal any such gap appearing in the turbine during operation or repair, W-type seals have been provided between the nozzle retaining ring and the shrouds. However, the W-type seals have not proven effective. For example, a W-type seal can be jammed during assembly of the turbine, i.e., by relative radial movement between the nozzle ring and the shrouds during installation. Also, the W-type seal has been observed to crack during operation as a result of low-cycle fatigue. Consequently, there is a need for effectively sealing between the nozzle ring and the shrouds of the stage of a turbine which would tolerate the warpage of the nozzle ring and shroud, eliminate leakage and improve the robustness of the seal at that sealing location.

BRIEF DESCRIPTION OF THE INVENTION

In accordance with a preferred embodiment of the present invention, there is provided a composite tubular woven seal for disposition between the nozzle retaining ring and the annular array of shrouds of a turbine stage to effectuate a seal, notwithstanding relative movement of the nozzle ring and shrouds during installation and warpage during operation. An annular cavity is formed in one of the axially registering surfaces of the nozzle retaining ring and shrouds, preferably the shrouds, and which cavity provides a seat for the seal. A composite tubular woven seal is disposed in the cavity and bears against the annular sealing surface of the nozzle retaining ring. Thus, when the nozzle retaining ring and shrouds are installed, the composite tubular woven seal is resiliently and compliantly flattened between the axially opposed sealing surfaces of the respective nozzle retaining ring and shrouds to seal between those surfaces. That is, the diameter of the woven tubular seal is greater than the depth of the cavity whereby the compliant seal is flattened in the cavity between the base of the cavity and the opposing sealing surface. Thus, in the event of any warpage or opening of a gap between the nozzle retaining ring and shroud, the compliant seal will expand to provide an effective seal.

The composite tubular woven supplemental seal is compliant as a result of the multiple layers forming the seal. The layers include an inner woven metal core, a fiber material, a metallic foil and a metal outer covering. Preferably, the inner metal core is formed of a woven stainless steel which is surrounded by a silica fiber. The fiber, in turn, is surrounded by a stainless steel metal foil and the outer covering is formed of a braided metal, for example, Haynes 188. Because of the nature of the composite tubular woven seal, the seal is compliant, particularly as a result of the resiliency of the metal core and surrounding silica fiber. Moreover, the metal foil layer surrounding the fiber prevents leakage between the supplemental seal and the sealing surface of the nozzle support ring, while the braided outer covering serves as a protective wear surface. The inner metal core and silica fibers retain the generally circular configuration of the supplemental seal in cross-section such that the seal, when compressed, is preloaded or biased for return to its circular cross-sectional configuration.

In a preferred embodiment according to the present invention, there is provided a turbine comprising a turbine nozzle retaining ring having a generally axially facing first surface and forming part of a turbine stage, a turbine shroud segment having a second surface in axial opposition to the first surface and forming part of the turbine stage, a cavity in one of the retaining ring and the shroud segment, the cavity opening generally in an axial direction and toward another of the retaining ring and the shroud segment and a compliant seal in the cavity including a seal body formed of multiple layers of different materials for compliantly engaging against one of the first and second surfaces opposite the cavity to seal thereagainst.

In a further preferred embodiment according to the present invention, there is provided a gas turbine comprising a turbine nozzle retaining ring having a generally axially facing annular first surface and forming part of a turbine stage, a plurality of turbine shroud segments defining an annular array thereof and an annular second surface in axial opposition to the first surface, an annular cavity in one of the first and second surfaces opening generally in an axial direction and toward another of the first and second surfaces and a compliant seal in the cavity including a seal body formed of multiple layers of different materials for compliantly engaging against another of the first and second surfaces opposite the cavity to seal thereagainst.

DETAILED DESCRIPTION OF THE INVENTION

Figure 1:
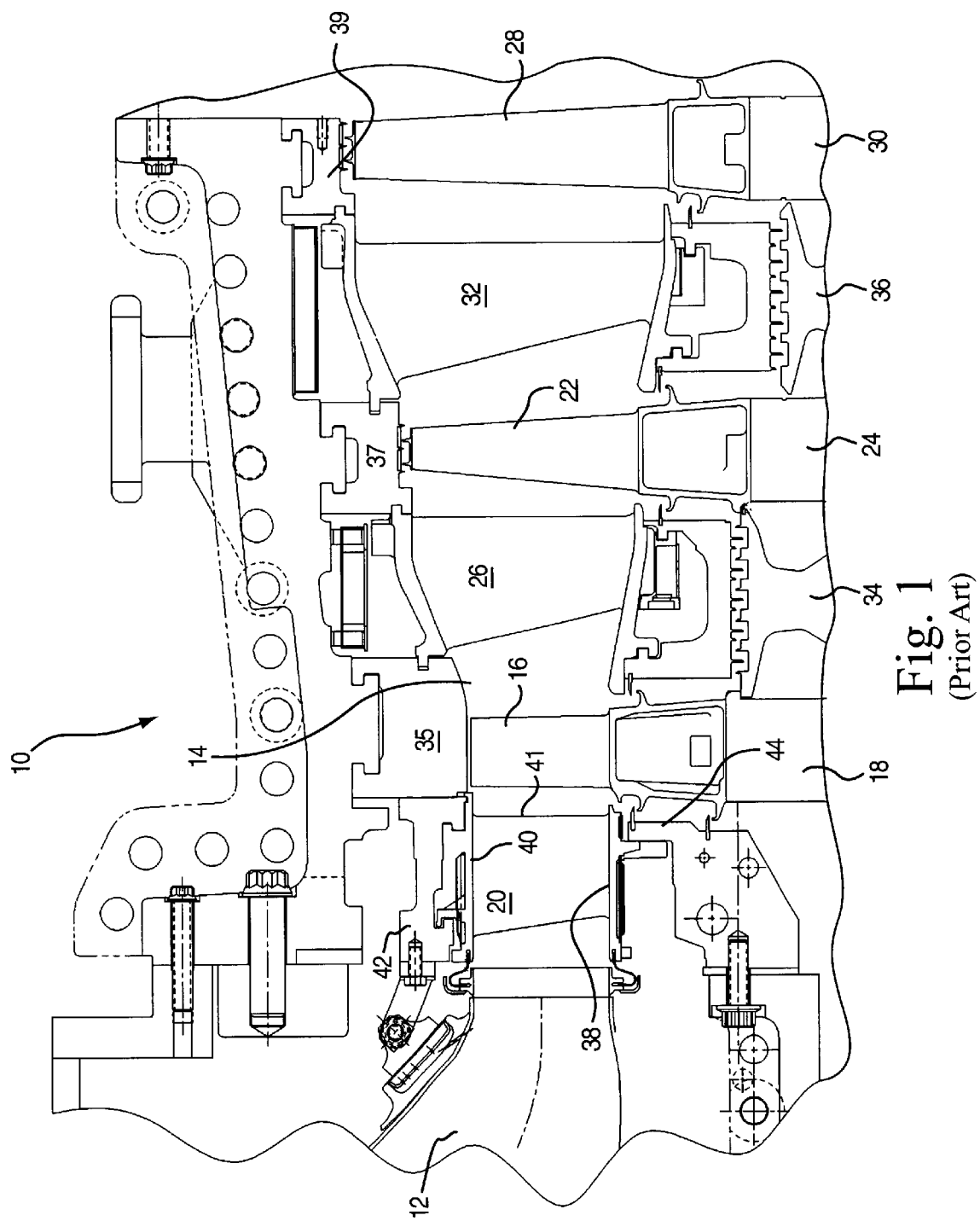
FIG. 1 is a fragmentary schematic side elevational view of a portion of a gas turbine.

Referring now to FIG. 1, there is illustrated a representative example of a turbine section of a gas turbine, generally designated 10. Turbine 10 receives hot gases of combustion from an annular array of combustors, not shown, which transmit the hot gases through a transition piece 12 for flow along an annular hot gas path 14. Turbine stages are disposed along the hot gas path 14. Each stage comprises a plurality of circumferentially spaced buckets mounted on and forming part of the turbine rotor and a plurality of circumferentially spaced stator vanes forming an annular array of nozzles. For example, the first stage includes a plurality of circumferentially-spaced buckets 16 mounted on a first-stage rotor wheel 18 and a plurality of circumferentially-spaced stator vanes 20. Similarly, the second stage includes a plurality of buckets 22 mounted on a rotor wheel 24 and a plurality of circumferentially-spaced stator vanes 26. Additional stages may be provided, for example, a third stage comprised of a plurality of circumferentially-spaced buckets 28 mounted on a third-stage rotor wheel 30 and a plurality of circumferentially-spaced stator vanes 32. It will be appreciated that the stator vanes 20, 26 and 32 are mounted on and fixed to a turbine casing, while the buckets 16, 22 and 28 and wheels 18, 24 and 30 form part of the turbine rotor. Between the rotor wheels are spacers 34 and 36 which also form part of the turbine rotor. An annular array of shroud segments 35, 37 and 39 are provided radially outwardly of the buckets 16, 22 and 28, respectively, to form an annular shroud about the buckets, and in part define the flow path through the turbine.

Referring to the first stage of the turbine, the stator vanes 20 forming the first-stage nozzles are disposed between inner and outer bands 38 and 40, respectively, supported from the turbine casing. As noted above, the nozzles of the first stage are formed of a plurality of nozzle segments 41 each mounting one, preferably two, stator vanes extending between inner and outer band portions and arranged in an annular array of segments. A nozzle retaining ring 42 connected to the turbine casing is coupled to the outer band and secures the first-stage nozzle. A nozzle support ring 44 radially inwardly of the inner band 38 of the first-stage nozzles engages the inner band 38.

Figure 2:
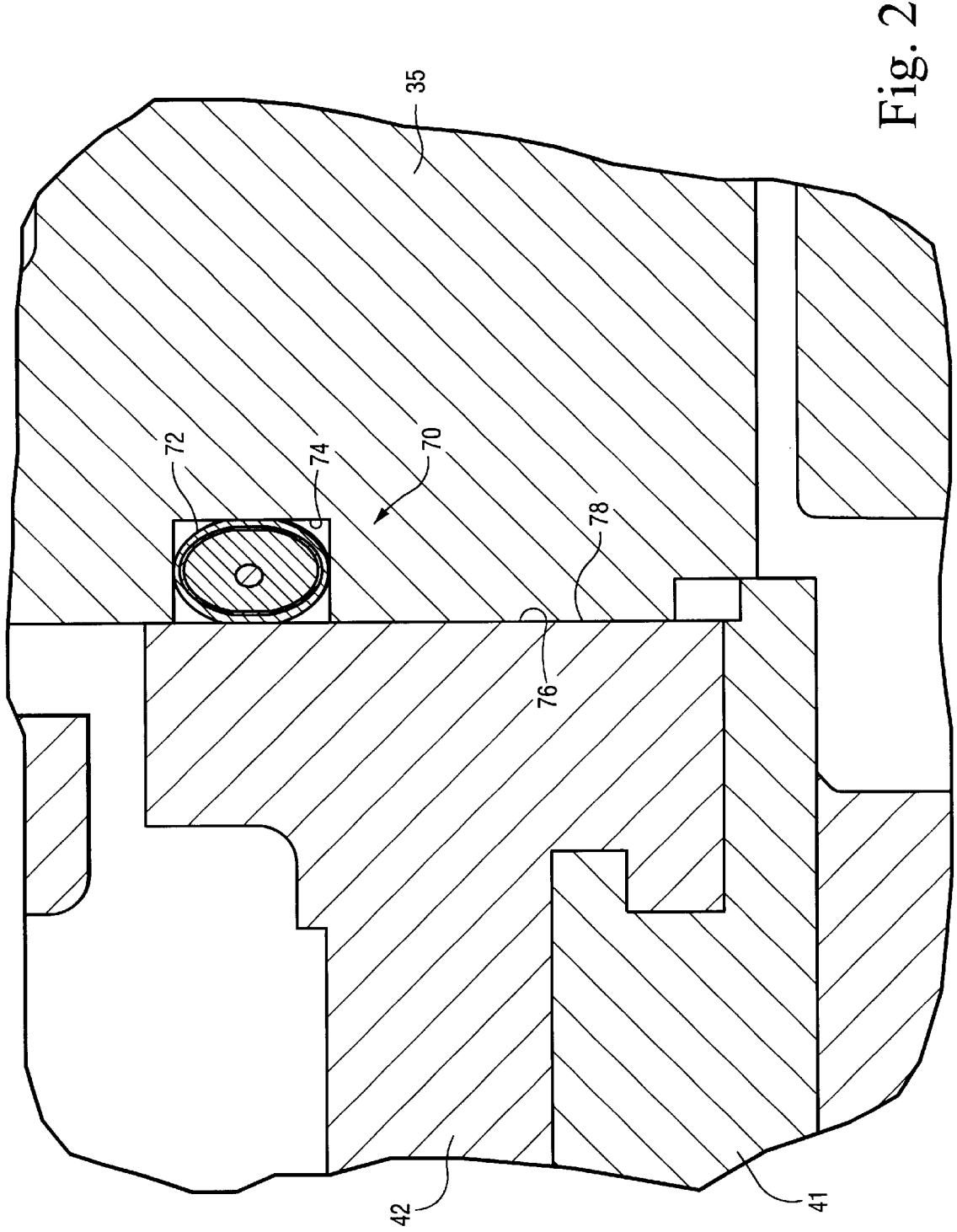
FIG. 2 is an enlarged cross-sectional view illustrating an interface between a nozzle retaining ring and a shroud with a compliant tubular woven seal therebetween in accordance with a preferred embodiment of the present invention.

As noted previously, the nozzle ring and the shroud segments may form leakage gaps or paths as a result of improper installation and/or repair. In order to inhibit or prevent leakage flow, there is provided a compliant woven tubular seal for sealing between the nozzle ring and the shroud segments, e.g., between the nozzle retaining ring 42 and the shroud segments 35. Referring to FIG. 2, the seal, generally indicated 70, includes a compliant seal body 72 disposed in a cavity 74 formed in one of the axially opposing surfaces 76 and 78 of the nozzle ring and shroud segments, respectively. As illustrated and preferably, the cavity 74 is formed in the shroud segments. It will be appreciated that the cavity is arcuate and extends a full 360° to seal between the nozzle ring and the shroud segments.

Figure 3:
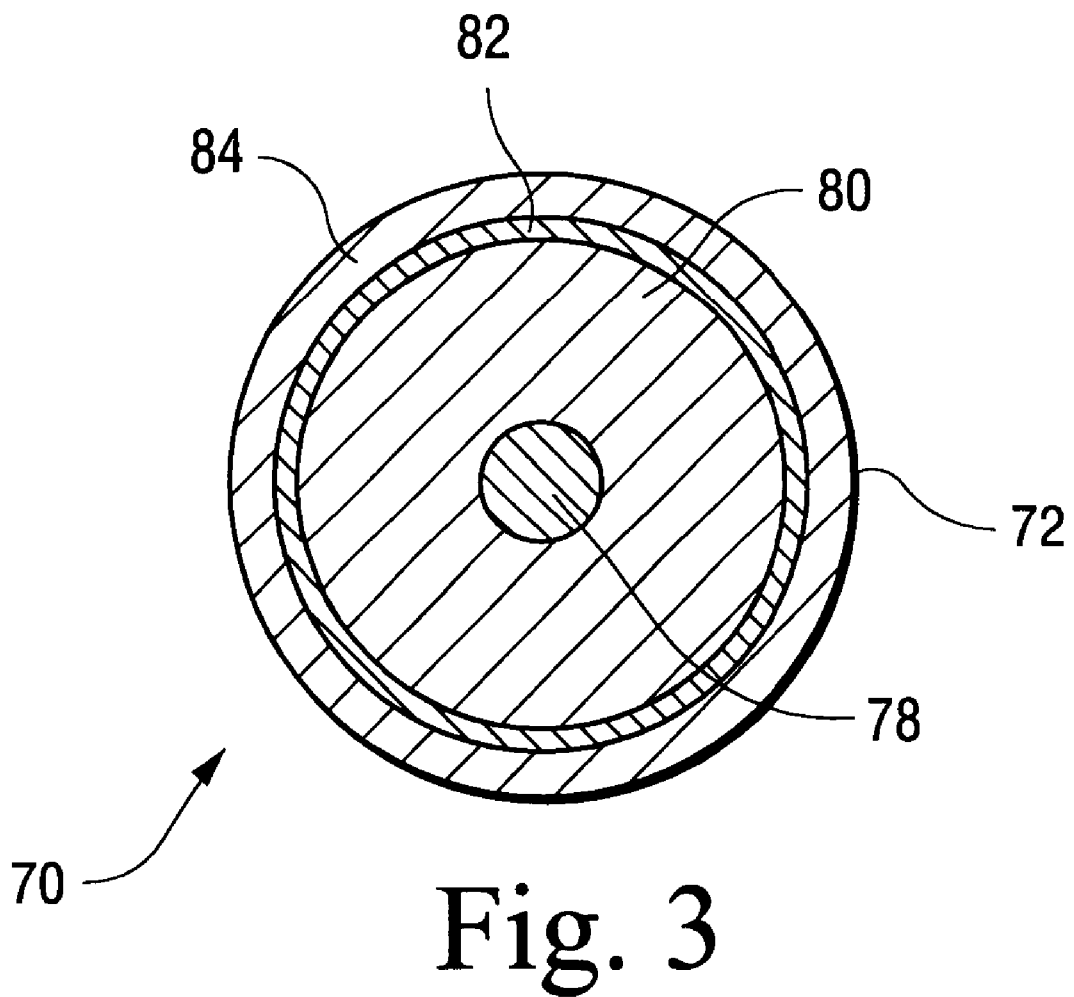
FIG. 3 is an enlarged cross-sectional view illustrating the component parts of the seal.

The seal body 72 preferably comprises a solid ring which, in an uncompressed condition, has a circular cross-section, as illustrated in FIG. 3. The seal body 72 is formed of multiple layers of material. Preferably, the innermost layer 78 comprises a woven metal core formed of a stainless steel material. Surrounding the metal core 78 is an annular layer of fiber, preferably a silica fiber 80. Surrounding the silica fiber 80 is a metal foil 82, preferably formed of stainless steel. Finally, the outer covering 84 for the seal body 72 includes a metallic braided material, preferably a braided steel material such as Haynes 188. The composite tubular woven seal 70 is compliant in a lateral direction, i.e., is biased or preloaded to return to its circular cross-sectional shape in the event of compression in a direction corresponding to the axis of the ring.

As illustrated in FIG. 2, the cavity 74 has a width in a radial direction slightly larger than the diameter of the seal body 70. However, the depth of the cavity is short of or less than the diameter of the seal body. Consequently, upon installation of the seal body 70 into cavity 74 and mating of the nozzle retainer ring 42 and shroud segment 35, the composite tubular woven seal is compliantly crushed between the base of the cavity 74 and the surface 76 of the nozzle retainer ring 42. Consequently, in the event of any relative movement between the nozzle retainer ring 42 and the shroud segments 35 opening a gap, the composite tubular woven seal 70 expands to form a seal between the axially opposite surfaces 76 and 78 due to its compliant nature. The woven metallic core 78 in combination with the heat-resistant silica layer enables the seal body to tend to return to its circular configuration in cross-section. The metal foil layer 82 prevents leakage past the seal 70. The wear-resistant outer braiding serves as a protective covering and wear surface.

Preferably, the seal body 72 is provided in 90° or 180° lengths. Consequently, the seal 70 spans between adjacent shroud segments. The compliant nature of the seal 70 effectively seals any gaps between the nozzle retaining ring 42 and the shroud segments 35.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine comprising:
   a turbine nozzle retaining ring having a generally axially facing first surface and forming part of a turbine stage;
   a turbine shroud segment having a second surface in axial opposition to said first surface and forming part of said turbine stage:
   a cavity in one of said retaining ring and said shroud segment, said cavity opening generally in an axial direction and toward another of said retaining ring and said shroud segment;
   a compliant seal in said cavity including a seal body formed of multiple layers of different materials for compliantly engaging against one of said first and second surfaces opposite said cavity to seal thereagainst; and
   said materials of said seal body comprising a woven metal core, a fiber, a metallic foil and a protective metal layer.

2. A turbine according to claim 1 wherein said cavity and said seal body are arcuate in a circumferential direction about an axis of the turbine.

3. A turbine comprising:
   a turbine nozzle retaining ring having a generally axially facing first surface and forming part of a turbine stage;
   a turbine shroud segment having a second surface in axial opposition to said first surface and forming part of said turbine stage;
   a cavity in one of said retaining ring and said shroud segment, said cavity opening generally in an axial direction and toward another of said retaining ring and said shroud segment;

a compliant seal in said cavity including a seal body formed of multiple layers of different materials for compliantly engaging against one of said first and second surfaces opposite said cavity to seal thereagainst; and said materials of said seal body comprising an inner woven metal core, a silica fiber, a metal foil and a braided metal outer protective layer.

4. A turbine comprising:

a turbine nozzle retaining ring having a generally axially facing first surface and forming part of a turbine stage;

a turbine shroud segment having a second surface in axial opposition to said first surface and forming part of said turbine stage;

a cavity in one of said retaining ring and said shroud segment, said cavity opening generally in an axial direction and toward another of said retaining ring and said shroud segment;

a compliant seal in said cavity including a seal body formed of multiple layers of different materials for compliantly engaging against one of said first and second surfaces opposite said cavity to seal thereagainst; and said cavity being formed in said second surface, said seal body compliantly engaging said first surface.

5. A turbine according to claim 4 wherein said materials of said seal body comprise a woven metal core, a fiber, a metallic foil and a protective metal layer.

6. A turbine according to claim 4 wherein said materials of said seal body comprise an innermost woven metal core, a silica fiber, a metal foil and a braided metal outer protective layer.

7. A gas turbine comprising:

a turbine nozzle retaining ring having a generally axially facing annular first surface and forming part of a turbine stage;

a plurality of turbine shroud segments defining an annular array thereof and an annular second surface in axial opposition to said first surface;

an annular cavity in one of said first and second surfaces opening generally in an axial direction and toward another of said first and second surfaces;

a compliant seal in said cavity including a seal body formed of multiple layers of different materials for compliantly engaging against said another of said first and second surfaces opposite said cavity to seal thereagainst; and said materials of said seal body comprising a woven metal core, a fiber, a metallic foil and a protective metal layer.

8. A gas turbine comprising:

a turbine nozzle retaining ring having a generally axially facing annular first surface and forming part of a turbine stage;

a plurality of turbine shroud segments defining an annular array thereof and an annular second surface in axial opposition to said first surface;

an annular cavity in one of said first and second surfaces opening generally in an axial direction and toward another of said first and second surfaces;

a compliant seal in said cavity including a seal body formed of multiple layers of different materials for compliantly engaging against said another of said first and second surfaces opposite said cavity to seal thereagainst; and said materials of said seal body comprising an inner woven metal core, a silica fiber, a metal foil and a braided metal outer protective layer.

9. A gas turbine comprising:

a turbine nozzle retaining ring having a generally axially facing annular first surface and forming part of a turbine stage;

a plurality of turbine shroud segments defining an annular array thereof and an annular second surface in axial opposition to said first surface;

an annular cavity in one of said first and second surfaces opening generally in an axial direction and toward another of said first and second surfaces;

a compliant seal in said cavity including a seal body formed of multiple layers of different materials for compliantly engaging against said another of said first and second surfaces opposite said cavity to seal thereagainst; and said cavity being formed in said second surface, said seal body compliantly engaging said first surface.

10. A gas turbine according to claim 9 wherein said materials of said seal body comprise a woven metal core, a fiber, a metallic foil and a protective metal layer.

11. A gas turbine according to claim 9 wherein said materials of said seal body comprise an innermost woven metal core, a silica fiber, a metal foil and a braided metal outer protective layer.

12. A gas turbine comprising:

a turbine nozzle retaining ring having a generally axially facing annular first surface and forming part of a turbine stage;

a plurality of turbine shroud segments defining an annular array thereof and an annular second surface in axial opposition to said first surface;

an annular cavity in one of said first and second surfaces opening generally in an axial direction and toward another of said first and second surfaces;

a compliant seal in said cavity including a seal body formed of multiple layers of different materials for compliantly engaging against said another of said first and second surfaces opposite said cavity to seal thereagainst; and said cavity being formed in said second surface, said seal body compliantly engaging said first surface, said materials of said seal body including a central inner woven metal core, a silica fiber surrounding said core, a metal foil surrounding said fiber and a braided metal outer protective layer.

13. A gas turbine comprising:

a turbine nozzle retaining ring having a generally axially facing annular first surface and forming part of a turbine stage;

a plurality of turbine shroud segments defining an annular array thereof and an annular second surface in axial opposition to said first surface;

an annular cavity in one of said first and second surfaces opening generally in an axial direction and toward another of said first and second surfaces;

a compliant seal in said cavity including a seal body formed of multiple layers of different materials for compliantly engaging against said another of said first and second surfaces opposite said cavity to seal thereagainst; and each of said shroud segments having a circumferential extent between opposite sides thereof, said cavity being formed in said second surface, said compliant seal having a circumferential extent in excess of the circumferential extent of said shroud segments to span the joint between adjacent shroud segments.

* * * * *